United States Patent [19]

Morio et al.

[11] 4,100,575

[45] Jul. 11, 1978

[54] METHOD OF AND APPARATUS FOR MODIFYING A VIDEO SIGNAL TO PREVENT UNAUTHORIZED RECORDING AND REPRODUCTION THEREOF

[75] Inventors: Minoru Morio; Masahiro Kambara, both of Tokyo, Japan

[73] Assignee: Sony Corporation, Tokyo, Japan

[21] Appl. No.: 778,709

[22] Filed: Mar. 17, 1977

[30] Foreign Application Priority Data

Mar. 22, 1976 [JP] Japan .................. 51-31108

[51] Int. Cl.² .............................................. H04N 1/44
[52] U.S. Cl. ...................... 358/120; 360/33; 360/37
[58] Field of Search ............. 358/120; 360/18, 33, 360/37

[56] References Cited

U.S. PATENT DOCUMENTS

| | | | |
|---|---|---|---|
| 3,963,865 | 6/1976 | Songer | 358/120 |
| 4,030,128 | 6/1977 | Perret | 360/33 |
| 4,040,099 | 8/1977 | Cook | 360/15 |

*Primary Examiner*—S. C. Buczinski
*Attorney, Agent, or Firm*—Lewis H. Eslinger; Alvin Sinderbrand

[57] ABSTRACT

A method of and apparatus for modifying a video signal such that a video picture can be reproduced on a television receiver in response to the modified video signal, but if the modified video signal is transmitted and then recorded on a video signal recorder, an accurate video picture cannot be reproduced if that recorded modified video signal subsequently is played back. The vertical blanking interval containing one set of equalizing pulses followed by a set of vertical synchronizing pulses followed by another set of equalizing pulses is modified by replacing a portion of the vertical synchronizing pulses and a portion of the set of equalizing pulses following the vertical synchronizing pulses with simulated equalizing pulses in at least some of the vertical blanking intervals. The amplitude and frequency of the simulated equalizing pulses are equal to that of the actual equalizing pulses.

In one embodiment, the modified video signal is transmitted via, for example, cable or RF transmission. In another embodiment, the modified video signal is recorded on a master recording medium. If the master recording medium subsequently is reproduced, the resulting, reproduced modified video signal can be transmitted for video display. However, if a copy of the master recording medium is made, an accurate video picture cannot be reproduced from subsequent reproduction of the copy medium.

20 Claims, 13 Drawing Figures

METHOD OF AND APPARATUS FOR MODIFYING A VIDEO SIGNAL TO PREVENT UNAUTHORIZED RECORDING AND REPRODUCTION THEREOF

BACKGROUND OF THE INVENTION

This invention relates to a method of and apparatus for modifying a video signal and, more particularly, to a method and apparatus wherein the vertical blanking interval of the video signal is modified such that a video picture can be reproduced directly from the modified video signal but an accurate video picture cannot be reproduced if the modified video signal is recorded and subsequently played back on, for example, a video signal recorder.

In some instances, it is desirable to modify a video signal so as to prevent unauthorized use thereof. For example, with the recent introduction of video signal recording systems, such as video tape recorders (VTR), it may be useful to discourage unauthorized recording of broadcasted television programs by modifying the video signals in a manner which would prevent the reproduction of a video picture in response to the recording and playing back of such video signals, but which would permit a video picture to be reproduced directly from the reception of the broadcasted video signals. As another example, if master video recording media, such as video tapes, are produced containing television broadcasting, it may be advantageous to modify the signals recorded on such tapes so that they can be played back in order to reproduce a video picture directly, but which would prevent the reproduction of a video picture if such tapes are copied.

Although such video signal modification can be attained by using unique encoding and decoding apparatus, such unique apparatus is quite expensive, especially since each television receiver would have to be provided with the decoding apparatus in order to reproduce a video picture from a received, encoded video signal.

One proposal for modifying a video signal in order to avoid the so-called piracy thereof is described in U.S. Pat. No. 3,963,865. This proposal proceeds upon the recognition that various VTR systems which are used, for example, in home entertainment systems, must detect particular signals included in the periodic vertical blanking interval of the video signal in order to achieve accurate reproduction of a video picture from the recorded video signals. In particular, such VTR systems detect the vertical synchronizing pulses included in the vertical blanking interval for the purpose of generating control signals having a frequency equal to the vertical blanking frequency. Control pulses are derived from these control signals and are recorded on a separate control track of the video recording tape by the VTR. During playback, the recorded control pulses are used to synchronize the rotation of the rotary playback heads with respect to the movement of video tape. If these control pulses are not recorded, the necessary synchronization between the playback heads and tape movement is lost, thereby resulting in a distorted, unintelligible video picture. In some VTR systems, the reproduced video signals are not transmitted to a television receiver, such as a television monitor, if the aforementioned control pulses are not detected.

In VTR systems of the aforedescribed type, the vertical synchronizing pulses included in a received video signal are detected by integrating all of the pulses contained in the vertical blanking interval. Because of the particular wave shape of the vertical synchronizing pulses, as established by, for example, NTSC standards, the integrated output will exceed some threshold level after a particular number of vertical synchronizing pulses has been received. A similar detection process is used in a conventional television receiver, except that a smaller number of vertical synchronizing pulses need be integrated for detection.

In accordance with these factors, the proposal described in U.S. Pat. No. 3,963,865 modifies the vertical blanking interval of a video signal by effectively "removing" all but one and one-half of the vertical synchronizing pulses included in the blanking interval. According to this patent, the integration of one and one-half vertical synchronizing pulses is sufficient for the proper operation of a television receiver but more vertical synchronizing pulses must be integrated for the recording of control pulses by a VTR system. In one embodiment, the removed vertical synchronizing pulses are replaced merely by a constant DC level. In another embodiment, the DC level of the removed vertical synchronizing pulses is shifted such that these pulses are not detected, and thus not integrated, either by the television receiver or by the VTR circuitry. In still another embodiment, the DC level of both the removed vertical synchronizing pulses and the equalizing pulses which normally follow the vertical synchronizing pulses is shifted to prevent such pulses from being detected.

By removing, or effectively removing, a substantial portion of the pulses included in the vertical blanking interval, horizontal synchronizing problems in a television receiver may result. That is, the automatic frequency control (AFC) circuit which is used in the television receiver to lock the horizontal deflection circuitry to the horizontal synchronizing pulse frequency cannot respond to the removed pulses during the vertical blanking interval. As is conventional, the vertical blanking interval includes one set of equalizing pulses of twice the horizontal line rate, followed by a set of vertical synchronizing pulses also of twice the horizontal line rate, followed by another set of equalizing pulses. The AFC circuit in the television receiver utilizes these equalizing and vertical synchronizing pulses during the vertical blanking interval to maintain a locked, or synchronized relation of the horizontal deflection circuitry. However, if a large portion of the vertical synchronizing pulses is removed, this locking relation cannot be maintained. Consequently, the first few lines of the video picture displayed by the television receiver may be distorted until the AFC circuit once again is synchronized to the horizontal line interval of the received video signal.

OBJECTS OF THE INVENTION

Therefore, it is an object of the present invention to provide a method of and apparatus for modifying a video signal so as to avoid the unauthorized use thereof which overcomes the aforenoted problem.

Another object of this invention is to provide a method of and apparatus for modifying the vertical blanking interval of a video signal so as to enable a television receiver to display a video picture upon reception of the modified video signal but prevent an accurate reproduction of a video picture if that modified video signal is recorded and subsequently reproduced without authorization.

A further object of this invention is to provide a method of and apparatus for modifying the vertical blanking interval of a video signal so as to prevent the unauthorized recording and reproduction of such modified video signal, while enabling an AFC circuit in a television receiver to be accurately controlled throughout the vertical blanking interval.

An additional object of this invention is to provide a method of and apparatus for producing a master video recording medium from which a recorded video signal, if re-recorded, would not, upon playback of the re-recorded video signal, reproduce an accurate video picture.

Various other objects, advantages and features of the present invention will become readily apparent from the ensuing detailed description, and the novel features will be particularly pointed out in the appended claims.

SUMMARY OF THE INVENTION

In accordance with the present invention, a method of and apparatus for processing a video signal of the type including a vertical blanking interval during which a set of equalizing pulses followed by a set of vertical synchronizing pulses followed by another set of equalizing pulses are transmitted, are provided wherein a portion of the vertical synchronizing pulses and at least a portion of the set of equalizing pulses which follows the vertical synchronizing pulses are replaced by simulated equalizing pulses, the simulated equalizing pulses having an amplitude and frequency which are the same as that of the original equalizing pulses. In one embodiment, the modified video signal is recorded on a master recording medium. In another embodiment, the modified video signal is transmitted for reception by television receivers.

BRIEF DESCRIPTION OF THE DRAWINGS

The following detailed description, given by way of example, will best be understood in conjunction with the accompanying drawings in which.

DETAILED DESCRIPTION OF PREFERRED EMBODIMENTS

Figure 2:
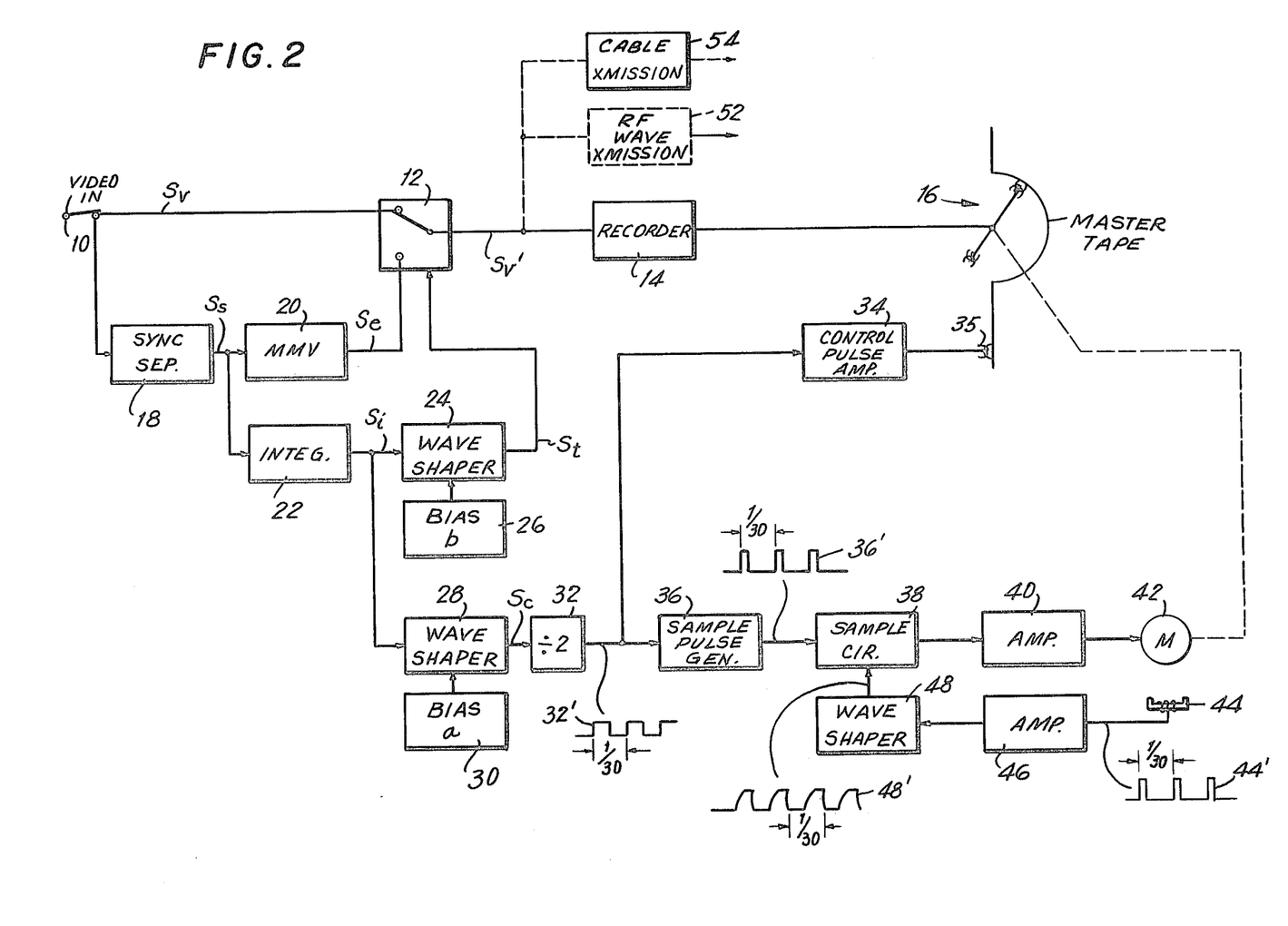
FIG. 2 is a block diagram of a preferred embodiment of video signal modifying apparatus in accordance with the present invention.

Turning now to the drawings, and particularly to FIG. 2, there is illustrated a block diagram of one embodiment of video signal modifying apparatus which functions to modify a video signal $S_v$ for the purpose of preventing unauthorized recording thereof. In particular, this signal modifying apparatus serves to alter the signals constituting the vertical blanking interval in a manner which does not affect the reception of such modified video signals by a television receiver, but which prevents an accurate video picture from being reproduced in response to the playback of an unauthorized recording of such modified video signal. An input terminal 10 is adapted to receive video signal $S_v$ and to supply same to a switching circuit 12. A synchronizing signal separator circuit 18 also is coupled to input terminal 10, the output of this synchronizing signal separating circuit being supplied to a monostable multivibrator 20 which, in turn, is coupled to another input of switching circuit 12. The switching circuit functions to modify the vertical blanking interval of video signal $S_v$ and to supply the thus modified video signal to output apparatus. In one example, the modified video signal, designated $S_v'$, may be supplied to a video signal recorder 14 for recording on a master recording medium, such as master tape, by suitable recording transducers 16. In an alternative embodiment, modified signal $S_v'$ may be transmitted, such as for broadcasting, to one or more television receivers via an RF wave transmission system 52 or via a cable transmission system 54. These transmission systems are conventional and need not be described further herein.

An integrator 22 is coupled to the output of synchronizing signal separator circuit 18 for a purpose soon to be described. The output of this integrator is supplied to a wave shaper circuit 24 to which a bias voltage supplied by a bias circuit 26 is applied, the output of wave shaper circuit 24 being coupled to switching circuit 12 to serve as a control signal therefor. This control signal functions to selectively connect either input terminal 10 or monostable multivibrator 20 to the output of switching circuit 12.

If the illustrated video signal modifying apparatus is used to prepare a master recording medium for subsequent transmission of the recorded modified video signal $S_v'$, additional circuitry is provided in order to control the recording operation and to provide necessary signals on the recording medium so as to control the subsequent playback operation. In this regard, the output of integrator 22 additionally is coupled to a wave shaper circuit 28, the latter also receiving a bias voltage from a bias circuit 30. The output of wave shaper circuit 28 is coupled through a frequency divider circuit 32 to a control pulse amplifier 34 which, in turn, is adapted to generate control pulses for recording on the master recording medium by a control signal transducer 35.

In one type of video signal recorder, transducers 16 are rotary transducers whose rotation is controlled in accordance with a servo control circuit formed of a sample pulse generator 36, a sample circuit 38, an amplifier 40, a motor 42, an amplifier 46 and a wave shaper circuit 48. Sample pulse generator 36 is coupled to frequency divider 32 and is capable of generating sample pulses which are synchronized with the signals produced by the frequency divider. These sample pulses are supplied to a sample circuit 38 for sampling the output of a wave shaper circuit 48. The sampled output derived from sample circuit 38 is, for example, a DC level which, after suitable amplification by amplifier 40, is supplied as a speed control voltage to motor 42. As depicted by the broken line shown in FIG. 2, motor 42 is mechanically coupled to transducers 16 to rotate these transducers. The operation of motor 42 is sensed by, for example, a pick-up transducer 44 which generates a series of pulses whose frequency is proportional to the speed of motor 42 and whose phase is proportional to the relative position of transducers 16. In one example, pick-up transducer 44 comprises a pickup coil and motor 42 is provided with a magnetic element at a predetermined location on, for example, the motor shaft. As this element rotates past pick-up coil 44, a corresponding pulse is generated thereby. Of course, if desired, alternative speed and position sensing apparatus can be used, for example, photoelectric sensors, or the like. The pulses produced by pick-up coil 44 are supplied to amplifier 46 and then to wave shaper circuit 48 from which a particular periodic waveform is derived. In one embodiment, wave shaper circuit 48 is formed of a monostable multivibrator which generates a pulse of predetermined duration in response to each pulse generated by pick-up coil 44. The output of this monostable multivibrator is coupled to an integrating circuit, preferably formed of a capacitor which is charged during the rise time of the monostable multivibrator output pulse and which is discharged during the decay time of this pulse. The resulting pulse waveform of wave shaper circuit 48 is as depicted by waveform 48'. The sample pulses produced by sample pulse generator 36 serve to sample the decaying portion of each pulse 48' in sample circuit 38.

Figure 1A:
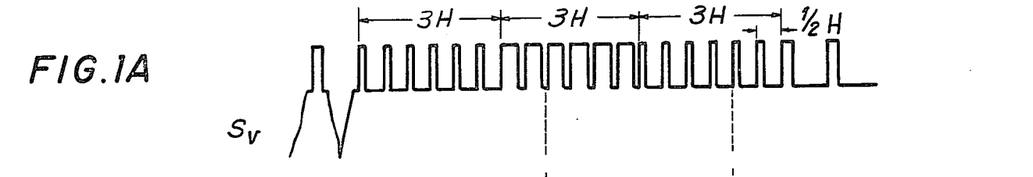
FIGS. 1A–1H are waveform diagrams which are helpful in understanding the operation of the present invention.

The manner in which the signal modifying apparatus operates now will be described in conjunction with the waveform diagram shown in FIGS. 1A–1F. It is assumed that video signal $S_v$ which is supplied to input terminal 10 is of the type having a vertical blanking interval during which one set of equalizing pulses followed by a set of vertical synchronizing pulses followed by another set of equalizing pulses are transmitted. As shown in FIG. 1A, both sets of equalizing pulses as well as the set of vertical synchronizing pulses have a frequency which is twice the horizontal line frequency. Furthermore, the first set of equalizing pulses occupies a duration corresponding to three horizontal line intervals (3H), the set of vertical synchronizing pulses also occupies a duration of 3H and the second set of equalizing pulses similarly occupies a duration of 3H. The illustrated waveform complies with the NTSC standard both for color television signals and black-and-white television signals. Hence, as shown, the duration of each equalizing pulse is much less than the duration of each vertical synchronizing pulse. With the signal format of the type shown in FIG. 1A, the vertical synchronizing pulses included in the vertical blanking interval can be readily detected.

Figure 1B:
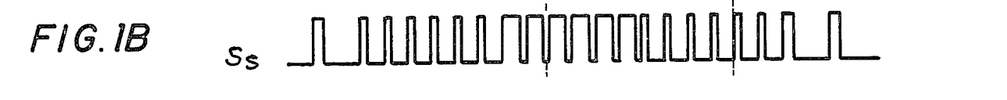
Figures 1C, 1D:
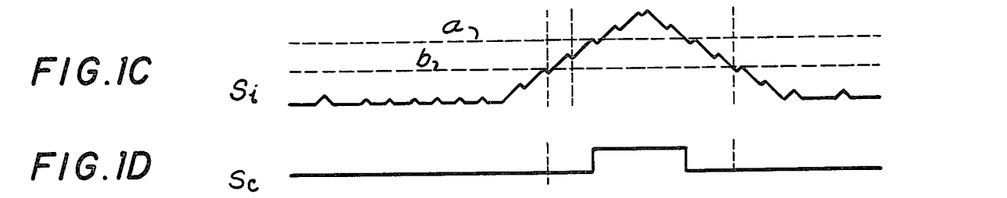
Figures 1D, 1E:
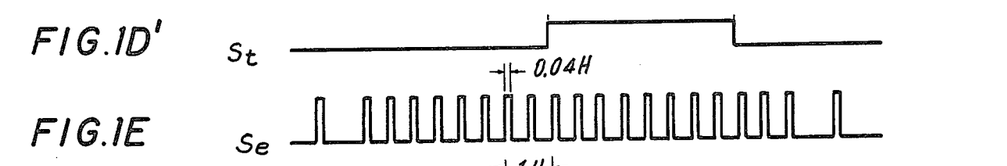

Synchronizing signal separator circuit 18 is conventional and is adapted to separate the synchronizing signals, including the horizontal synchronizing signals and those signals which are included in the vertical blanking interval from the received video signal $S_v$. The separated synchronizing signals which occur during the vertical blanking intervals are designated $S_s$, and are illustrated as the waveform shown in FIG. 1B. It is seen that the waveform of FIG. 1B is substantially the same as the waveform of FIG. 1A except that the video information does not appear in the separated synchronizing signal $S_s$ shown in FIG. 1B. Each pulse included in the separated synchronizing signal $S_s$ shown in FIG. 1B is used to actuate, or trigger monostable multivibrator 20. As one example thereof, it will be assumed that the monostable multivibrator is responsive to the positive transition of a pulse applied thereto so as to produce an output pulse of predetermined duration. Let it be assumed that the pulses produced by monostable multivibrator 20 have a duration of, for example, 0.04H, which is equal to the duration of each of the equalizing pulses included in the vertical blanking interval of video signal $S_v$. The output pulses $S_e$ of monostable multivibrator 20 are shown in FIG. 1E and are seen to be simulated versions of the equalizing pulses which are included in the vertical blanking interval of video signal $S_v$. As shown in FIG. 2, both the recevied video signal $S_v$ and the simulated equalizing pulses $S_e$ are supplied to switching circuit 12.

As shown in FIG. 2, the separated synchronizing signal $S_s$ also is supplied to integrator 22. This integrator is adapted to produce an output level of increasing magnitude in response to an input pulse, the magnitude of this output level decreasing after the input pulse is terminated. Hence, in one embodiment, integrator 22 includes a capacitor which is charged in response to an input pulse and which is discharged during the interval that separates successive input pulses. The output level of integrator 22 thus is related to the duration of each input pulse. As shown in FIG. 1C, the integrator output level $S_i$ remains at a relatively low magnitude in response to the equalizing pulses which are of narrow duration. That is, the interval which separates successive equalizing pulses exceeds the equalizing pulse duration, the level produced by integrating the equalizing pulses remains low. However, since the vertical synchronizing pulses are of much greater duration, the integrator charges for a longer duration in response to the vertical synchronizing pulses than in response to the equalizing pulses. As shown in FIG. 1C, the output $S_i$ of integrator 22 appears as an increasing DC level in response to the vertical synchronizing pulses. Of course, during the second equalizing pulse interval following the vertical synchronizing pulses, the integrator discharges and the output level $S_i$ appears as a decreasing DC level.

The output $S_i$ of integrator 22 is compared to a threshold level $b$ in wave shaper circuit 24. The wave shaper circuit may, for example, comprise a Schmitt trigger circuit, or other threshold circuit whose threshold level is derived from the bias voltage supplied by bias network 26. Thus, when signal $S_i$ exceeds threshold level $b$, wave shaper circuit is triggered to produce an output signal $S_t$, as shown in FIG. 1D'. Similarly, when integrated signal level $S_i$ falls below threshold level $b$, signal $S_t$ returns abruptly to its lower level, as also shown in FIG. 1D'. Thus, signal $S_t$ appears as a rectangular pulse whose duration is equal to the interval during which integrator output level $S_i$ exceeds threshold level $b$. Stated otherwise, rectangular pulse signal $S_t$ is generated after a predetermined number of vertical synchronizing pulses have been received. This predetermined number, illustrated herein as two vertical synchronizing pulses, is a function of the time constant of integrator 22 and of threshold level $b$.

Figure 1F:
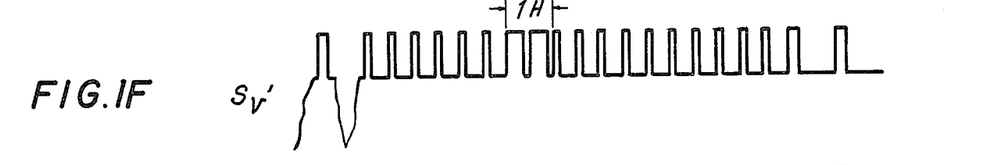

Signal $S_t$ is used as a control signal to control the operation of switching circuit 12. That is, when control signal $S_t$ exhibits its relatively lower level, the received video signal $S_v$ is supplied to the output of the switching circuit. However, when control signal $S_t$ exhibits its relatively higher level, switching circuit 12 is energized to supply the simulated equalizing pulses $S_e$ to its output terminal. Thus, the modified video signal $S_v'$ appears as shown in FIG. 1F wherein the first set of equalizing pulses followed by the predetermined number of vertical synchronizing pulses included in the vertical blanking interval of video signal $S_v$ are transmitted through switching circuit 12, and then this switching circuit is energized to transmit the simulated equalizing pulses $S_e$ for the duration that control signal $S_t$ remains at its higher level. When this control signal returns to its lower level, the received video signal $S_v$ once again is transmitted through switching circuit 12.

Since the simulated equalizing pulses $S_e$ are of the same amplitude and frequency as the actual equalizing pulses (shown in FIG. 1A), there is no level shifting during the vertical synchronizing pulse interval and the immediately following equalizing pulse interval. Furthermore, there is no "removal" of pulse information following the predetermined number of vertical synchronizing pulses. Therefore, since both the vertical synchronizing pulses and the equalizing pulses are of the same frequency, there is no loss of frequency information during the period that the simulated equalizing pulses $S_e$ are substituted for vertical synchronizing pulses and other equalizing pulses during the vertical blanking interval. As a consequence thereof, the AFC circuit normally provided in a conventional television receiver is locked properly to horizontal frequency information throughout the vertical blanking interval.

The modified video signal $S_v'$, shown in FIG. 1F, then can be transmitted directly via RF wave transmission system 52 or cable transmission system 54. The presence of two vertical synchronizing pulses during the vertical blanking interval in the modified video signal $S_v'$ is sufficient to enable the vertical oscillator located in a television receiver to be locked to the vertical synchronizing frequency. Thus, notwithstanding the modification in the vertical blanking interval of the video signal, a television receiver can respond accurately to the modified video signal $S_v'$ and to reproduce a video picture in response thereto.

As shown in FIG. 2, the modified video signal $S_v'$ can be recorded on, for example, a master tape by suitable video signal recording apparatus 14, such as a VTR system. As aforedescribed, in some VTR systems, a periodic control pulse is recorded in a separate control track on the recording tape. This control pulse is used during a playback operation in a servo control circuit for controlling the speed and positioning of rotary playback transducers, as will be described below. For the purpose of generating these control pulses, wave shaper circuit 28 receives the integrator output signal $S_i$ and generates a pulse whenever the integrator output $S_i$ exceeds a threshold level, such as level $a$, shown in broken lines in FIG. 1C. To this effect, wave shaper circuit 28 is substantially similar to wave shaper circuit 24, except that the threshold level $a$ is established by bias network 30, this threshold level being higher than threshold level $b$ established by bias network 26. Accordingly, the output of wave shaper circuit 28 appears as the rectangular pulse $S_c$ shown in FIG. 1D. This pulse is produced after a second predetermined number of vertical synchronizing pulses, such as four vertical synchronizing pulses, are received. Also, when the integrator output $S_i$ decreases below threshold level $a$, the rectangular pulse $S_c$ returns from its relatively higher level to its lower level. Thus, a periodic pulse $S_c$ is produced by wave shaper circuit 28, this pulse having the vertical synchronizing frequency. In accordance with typical NTSC standards, the vertical synchronizing frequency is equal to 60 Hz.

The frequency of periodic pulse signal $S_c$ is divided by a factor of two in frequency divider 32 so as to produce periodic pulses 32' having a frequency of 30 Hz. This is the frequency of the control pulses which are recorded in the control track on the master tape. Accordingly, periodic pulses 32' are supplied to control pulse amplifier 34 which, for example, may include a monostable multivibrator or other one-shot circuit for generating control pulses having a relatively narrow width, but of the frequency of 30 Hz. These control pulses are recorded on the master tape by control pulse recording head 35.

While the servo control circuit for motor 42 has been described briefly hereinabove, the operation of this servo control circuit now will be explained. Motor 42 is mechanically coupled to rotary transducers 16 for driving these transducers. As aforesaid, a magnetic element is mounted on or secured to the shaft of motor 42 so as to exhibit a predetermined relation with respect to the rotary transducers. Pickup coil 44 is particularly disposed such that a pulse is generated thereby whenever the rotary transducers exhibit a predetermined positional relation with respect to the master tape. Hence, pulses 44', whose frequency of 30 Hz is equal to the rotational frequency of 30 rps of transducers 16, represent positional information of the transducers. Pulses 44' are amplified by amplifier 46 and supplied to wave shaper circuit 48 which generates waveform 48' in response thereto. As mentioned previously, waveform 48' can be produced by, for example, a monostable multivibrator which is triggered by pulses 44', connected in series with an integrating circuit, such as an integrating capacitor. Waveform 48' is supplied to sample circuit 38 whereat it is sampled by sample pulses 36', the latter being generated by sample pulse generator 36 in response to periodic pulses 32' supplied by frequency divider 32. Accordingly, sample pulse generator 36 may include a differentiator and rectifying circuit, a monostable multivibrator, or the like.

Waveform 48' is sampled during its decaying portion so as to produce a DC level corresponding to the sampled magnitude. This DC level, after amplification, is supplied to motor 42 to correspondingly energize the motor. Because of the feedback circuit forming the illustrated servo control circuit, any deviation in the rotational speed of motor 42 appears as a corresponding change in the sampled level produced by sample circuit 38 to, in turn, vary the motor speed. In this manner, the rotation of transducers 16 is controlled such that the transducers accurately scan successive oblique tracks across the master tape. Furthermore, since motor 42 is controlled as a function of the vertical synchronizing pulses included in the received video signal, transducers 16 are properly positioned so that the vertical blanking interval of the video signal is recorded at the end (or beginning) of each track.

Let it be assumed that the master tape which has been prepared by the apparatus shown in FIG. 2 is to be played back. The video signals which are reproduced during this playback operation can be used for further transmission, such as in a video tape broadcast, or can be used merely to display a corresponding video picture. In the latter application, the master tape may be included in, for example, a library of prerecorded tapes which are not be duplicated. As will be discussed below, if the modified video signal $S_v'$ is recorded on the master tape, this video signal, if re-recorded on, for example, a VTR of the home entertainment type, will not result in an accurately reproduced video picture.

Figure 3:
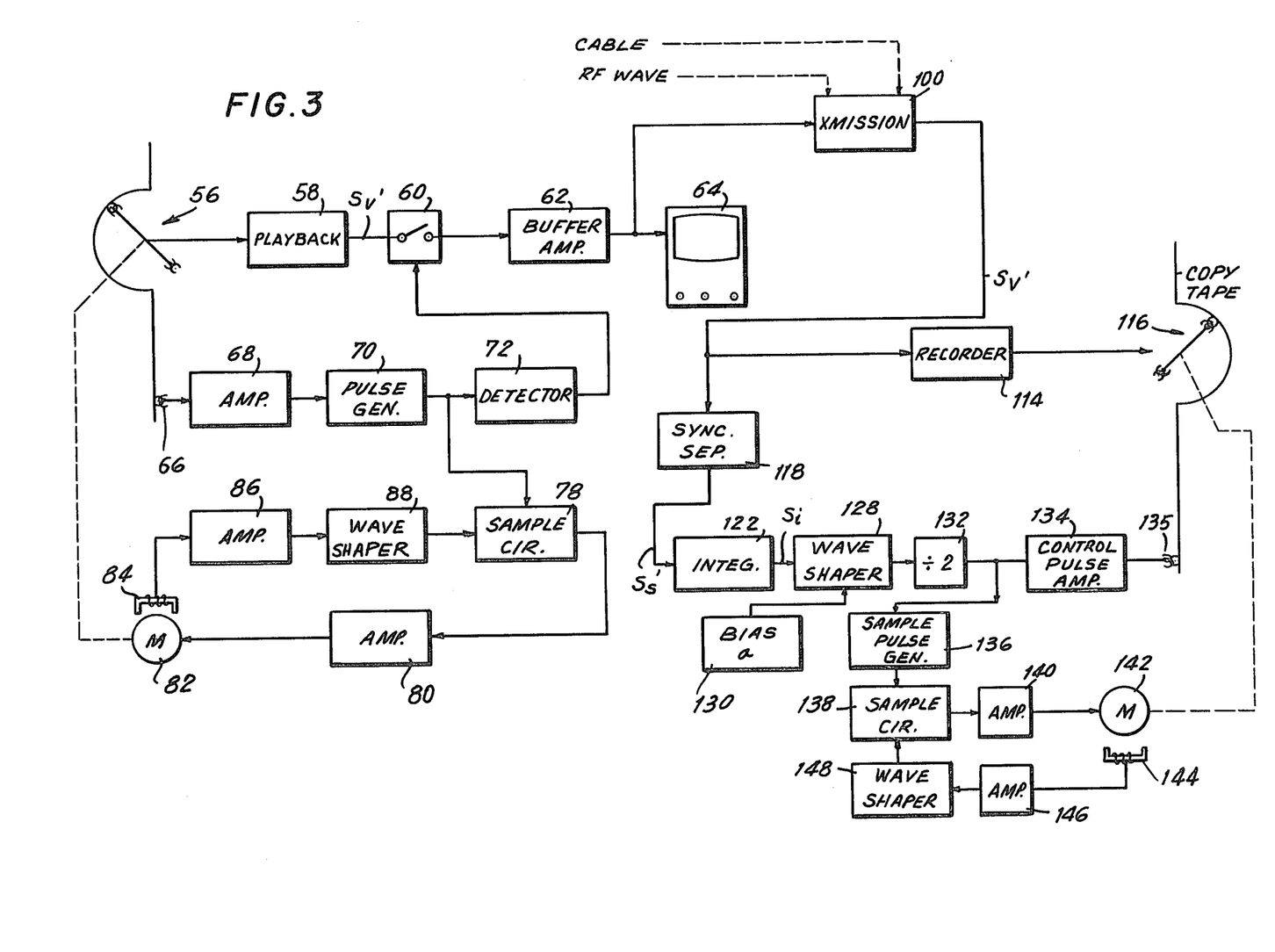
FIG. 3 is a block diagram of video signal playback apparatus which can be used in conjunction with a master recording medium prepared by the apparatus shown in FIG. 2, and video signal copying apparatus which may be used for the unauthorized recording of the modified video signal.

As shown in FIG. 3, the previously recorded master tape is played back by rotary transducers 56 which are coupled to conventional playback apparatus 58. The reproduced video signal $S_v'$ is supplied through a muting switch 60 to a buffer amplifier 62 for display on, for example, a monitor 64 or other television receiver. In addition, a control head 62 is positioned to sense the previously recorded control pulses in the control track of the master tape. Control head 66 is coupled via an amplifier 68 to a pulse generator 70 which is adapted to shape the reproduced control pulses so as to have the desired amplitude and duration. The output of pulse generator 70 is coupled to a detector circuit 72 which, in turn, controls muting switch 60 in accordance with a determination as to whether a control pulse is present. In one embodiment of the illustrated video signal playback apparatus, muting circuit 60 is opened in the event that control pulses are not detected so as to prevent a video picture from being reproduced in response to played back video signal $S_v'$. Conversely, if control pulses are detected, muting switch 60 is closed to supply monitor 64 with the modified video signal $S_v'$.

The output of pulse generator 70 also is coupled to a servo control circuit formed of sample circuit 78, amplifier 80, motor 82, pick-up coil 84, amplifier 86 and wave shaper circuit 88. As will be appreciated, this servo control circuit is substantially similar to the servo control circuit illustrated in FIG. 2. Hence, motor 82 is controlled by the pulses generated by pulse generator 70 so as to properly position rotary transducers 56 with respect to the oblique tracks recorded on the master tape. Stated otherwise, motor 82 is controlled in a fashion similar to the control of motor 42, except that the sample pulses which are supplied to sample circuit 78 are derived from the recorded control pulses, whereas the sample pulses supplied to sample circuit 38 are derived from the received vertical synchronizing pulses.

In operation, modified video signals $S_v'$ are reproduced by transducers 56 and derived from playback apparatus 58. Since the master tape had been provided with control pulses, these control pulses are sensed by control pulse head 66 and, after amplification and suitable wave shaping, are detected by detector circuit 72. Consequently, muting switch 60 is closed and the modified video signal $S_v'$ which had been played back is supplied to monitor 64 which reproduces a video picture in response thereto. Also, the amplified and shaped control pulses are supplied to sample circuit 78 for sampling the periodic waveform produced by wave shaper circuit 88. The resulting DC level produced by sample circuit 78 is used to accurately control motor 82. Thus, an accurate video picture is displayed on monitor 74 corresponding to the played back modified video signal $S_v'$, and in correspondence with the servo-controlled rotation of transducers 56.

The modified video signal $S_v'$ which is played back from the master tape can be transmitted in the form of a video broadcast, if desired. A transmission system 100 is provided to transmit this played back modified video signal or, as depicted by the broken lines, to transmit the modified video signal $S_v'$ in the form of an RF wave transmission or cable transmission, as mentioned with respect to FIG. 2. Although this transmitted modified video signal $S_v'$ can be used by a television receiver to reproduce a corresponding video picture, let it be assumed that this modified video signal also is recorded. Let it be further assumed that the recording apparatus is comprised of a conventional VTR of the home entertainment type. In one application thereof, an attempt may be made to use this VTR to re-record the modified video signal $S_v'$ produced at, for example, the output of buffer amplifier 62. In any event, let it be assumed that modified video signal $S_v'$ is supplied to recorder apparatus 114 for recording by transducers 116 on a copy tape.

As is conventional, the VTR recording section includes circuitry coupled to a control pulse recording head 135 for the purpose of recording periodic control pulses in a control track on the copy tape in response to the vertical synchronizing pulses normally included in a video signal. To this effect, a synchronizing signal separator circuit 118 is coupled to receive the modified video signal $S_v'$ for separating the synchronizing signals, including the vertical blanking interval, from the received video signal $S_v'$. The output of synchronizing signal separator circuit 118 is coupled to an integrator 122 which, in turn, is connected to a wave shaper circuit 128. Integrator circuit 122 is substantially similar to integrator circuit 22, described previously with respect to FIG. 2. Similarly, wave shaper circuit 128 is similar to wave shaper circuit 28 and, as shown, is supplied with a bias voltage $a$ from a bias network 130. The output of wave shaper circuit 128 is supplied through a frequency divider 132 (similar to aforedescribed frequency divider 32) to a control pulse amplifier 134, the latter being similar to control pulse amplifier 34 of FIG. 2. As shown, the output of control pulse amplifier 134 is coupled to control pulse recording head 135.

Transducers 116 are mechanically coupled to and driven by a motor 142. A servo control circuit formed of pick-up coil 144, amplifier 146, wave shaper circuit 148, sample pulse generator 136, sample circuit 138 and amplifier 140 are coupled to energize motor 142 in a manner similar to the servo control circuit coupled to motor 42 in FIG. 2. Hence, the respective elements included in the servo control circuit for motor 142 may be substantially similar to the corresponding elements included in the servo control circuit for motor 42. Furthermore, the sample pulses which are used in the servo control circuit for motor 142 are similar to sample pulses 36' shown in FIG. 2, and are derived from the detected vertical synchronizing pulses, as detected by integrator 122 and wave shaper circuit 128, in a manner similar to the detection of the vertical synchronizing pulses by integrator 22 and wave shaper circuit 28. Accordingly, in the interest of brevity, further description of the servo control circuit for motor 142 is omitted.

Figure 1G:
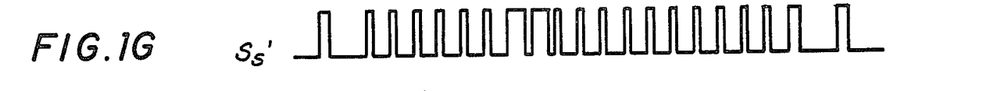
Figure 1H:
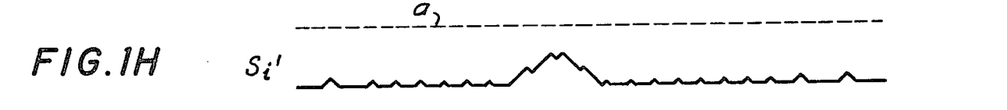

In operation, the modified video signal $S_v'$ which is supplied to the VTR recording apparatus exhibits the waveform shown in FIG. 1F. The various pulses included in the vertical blanking interval of the modified video signal $S_v'$ are separated by synchronizing signal separator circuit 118, as shown by the separated equalizing pulses, vertical synchronizing pulses, simulated equalizing pulses, and further equalizing pulses $S_s'$, in FIG. 1G. As was discussed previously with respect to integrator 22, the pulses $S_s'$ included in the separated vertical blanking interval as shown in FIG. 1G are integrated by integrator 122. Since each equalizing pulse and simulated equalizing pulse is of relatively narrow duration, the integrator output $S_i'$ remains at a relatively lower level in response to these pulses. However, the actual vertical synchronizing pulses are of wider duration so as to permit the capacitor included in integrator 122 to be charged. Nevertheless, since only two vertical synchronizing pulses are included in the modified video signal $S_v'$, the DC level of the integrator output $S_i'$ cannot increase to exceed threshold level $a$ supplied by bias network 130. Therefore, wave shaper circuit 128 is not capable of generating an output pulse, such as pulse $S_c$ in FIG. 1D. That is, the combination of integrator 122, wave shaper circuit 128 and bias network 130 does not detect the vertical synchronizing pulses which are included in the modified video signal $S_v'$. Because of this failure to detect the vertical synchronizing pulses, control pulses are not recorded on the copy tape by control pulse recording head 135. Also, since wave shaper circuit 128 does not produce an output pulse, sample pulse generator 136 is prevented from generating sampling pulses which are necessary to operate the servo control circuit coupled to motor 142. Since motor 142 cannot be accurately controlled, the relative positions of transducers 116 with respect to the moving copy tape may drift. Hence, the successive horizontal line intervals which are recorded on the copy tape are, in effect, randomly recorded. That is, a complete field is not necessarily recorded in each oblique track. Rather, portions of a field may be recorded during an end portion of one track and the beginning portion of the next track. As may be appreciated, this prevents the accurate reproduction of a video picture during playback of this copy tape.

Figure 4:
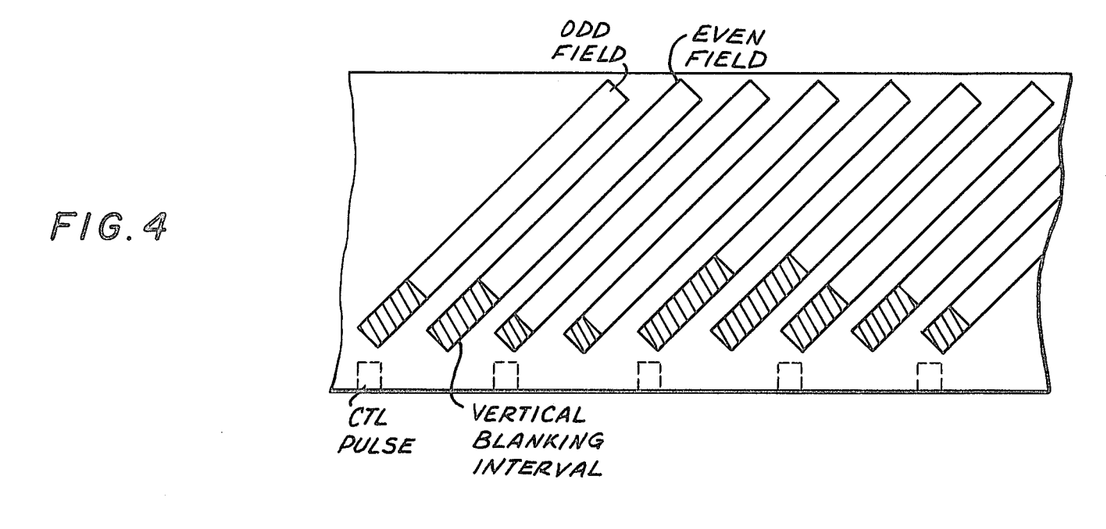
FIG. 4 is an illustrative example of a portion of the video signal recording medium prepared by the video signal copying apparatus shown in FIG. 3.

The recording of video signal $S_v'$ on the copy tape in the absence of detecting the vertical synchronizing pulses is diagrammatically represented in FIG. 4. During normal operation of the VTR recording apparatus, that is, if a proper number of vertical synchronizing pulses is present in the video signal such that the vertical synchronizing pulses can be detected by, for example, integrator 122 and wave shaper circuit 128, then a complete odd or even field will be recorded in successive oblique tracks. Furthermore, the vertical blanking interval will be recorded at the end portion of each field, or track; and in some embodiments, a portion of the vertical blanking interval also is recorded in the beginning portion of the next adjacent track. Still further, control pulses which are derived from the detected vertical synchronizing pulses are recorded in alignment with every alternate track, as shown by the broken line control pulse representations of FIG. 4. However, since the vertical synchronizing pulses are not detected, the control pulses are not recorded. Furthermore, in the absence of detecting the vertical synchronizing pulses, motor 142 is not servo-controlled. Hence, as mentioned above, the particular location of a transducer 116 relative to the copy tape no longer is synchronized with the received video signal. Consequently, instead of recording an odd field in one track followed by an even field in the next track, and so on, transducers 116 now may record a portion of odd and even fields in each track. This, of course, means that the vertical blanking interval will occur at random locations in successive tracks, such as shown by the shade lines in FIG. 4. If the video signals recorded as shown in FIG. 4 are played back, a distored, unintelligible video picture will be reproduced. Furthermore, in the absence of control pulses recorded on the copy tape, the control pulse detecting circuit, such as detector circuit 72 (FIG. 3) will maintain the muting switch (such as muting switch 60) in its opened position. Consequently, even the randomly occurring video signals which are played back from the tape shown in FIG. 4 will not be displayed. Also, since control signals are not recorded on the copy tape, the transducer drive motor will not be servo-controlled during a playback operation. Therefore, even if a muting switch (such as muting switch 60) is not provided in the VTR playback apparatus, the failure to control the transducer drive motor will result in a distorted, unintelligible video picture.

Figure 5:
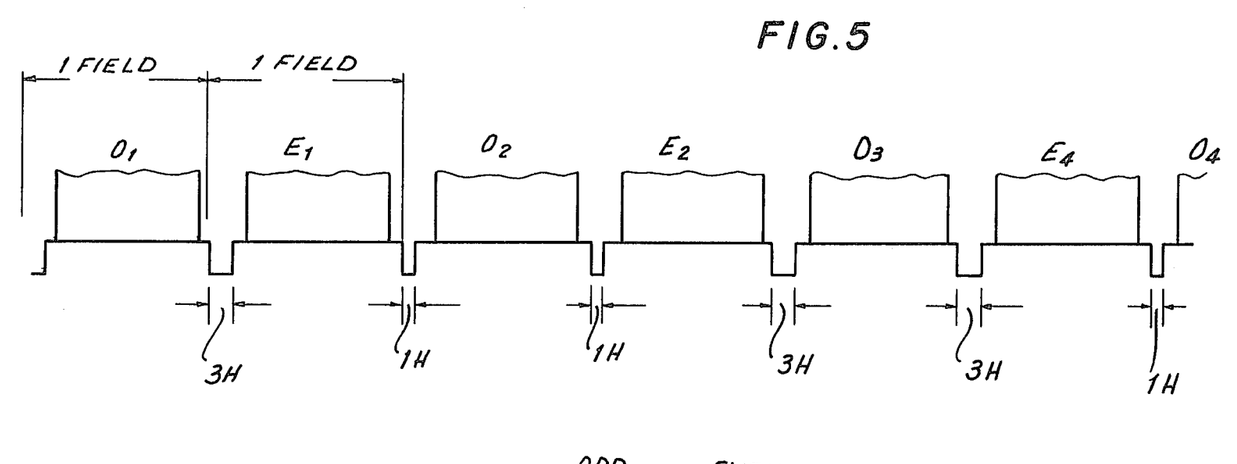
FIG. 5 is a waveform diagram which is helpful in explaining another embodiment of the present invention.

In the foregoing description, it has been assumed that each vertical blanking interval in the video signal will be modified such that a portion of the vertical synchronizing pulses and a portion of the following equalizing pulses will be replaced by simulated equalizing pulses. However, in an alternative embodiment, this replacement operation, or substitution, may be effected only during random vertical blanking intervals. That is, rather than modify each vertical blanking interval in the manner described above, only every other or every third vertical blanking interval, or random vertical blanking intervals may be modified. The resulting modified video signal may appear as shown in FIG. 5 wherein the vertical synchronizing pulse interval whose duration is equal to 3H is not modified, while the vertical synchronizing pulse interval whose duration is equal to 1H is so modified. In this alternative embodiment, the vertical oscillator included in a television receiver can be frequency and phase locked to the received vertical synchronizing pulses via a phase-locked loop having a pull-in range which differs from the pull-in range which would be used in the event that every vertical blanking interval is modified. To this effect, a counter circuit may be coupled between wave shaper circuit 24 and switching circuit 12 so as to control the switching circuit only after a predetermined number (or, if desired, a random number) of control pulses $S_t$ are counted.

While the foregoing has particularly shown and described preferred embodiments of the present invention, it should be readily apparent that various changes and modifications in form and details may be made by one of ordinary skill in the art without departing from the spirit and scope of the invention. For example, the number of vertical synchronizing pulses which remain in the vertical blanking interval of the modified video signal $S_v'$ is a function of the time constant of integrator 22 and bias voltage $b$. However, the number of vertical synchronizing pulses which remain in the vertical blanking interval should be sufficient so as to be detected by a conventional television receiver. Also, the number of such vertical synchronizing pulses should be less than that required for detection by a VTR. In this regard, integrator 22 may be replaced by equivalent vertical synchronizing pulse counting circuitry.

Therefore, it is intended that the appended claims be interpeted as including the foregoing as well as other such changes and modifications.

What is claimed is:

1. A method of modifying the vertical blanking interval of a video signal, such as an NTSC signal, so as to enable a television receiver to display a video picture upon reception of the modified video signal but prevent an accurate reproduction of a video picture in the event that the modified video signal is recorded and subsequently reproduced, the vertical blanking interval including one set of equalizing pulses followed by a set of vertical synchronizing pulses followed by another set of equalizing pulses, comprising the steps of detecting a predetermined number of said vertical synchronizing pulses; generating a simulated version of said equalizing pulses; and substituting said simulated version of equalizing pulses for those remaining vertical synchronizing pulses following said detected predetermined number and for at least a portion of said other set of equalizing pulses in the vertical blanking interval of said video signal.

2. The method of claim 1 wherein said step of detecting said predetermined number of vertical synchronizing pulses comprises separating said vertical blanking interval from the video signal; integrating the vertical synchronizing pulses included in said vertical blanking interval; and detecting when the product of integrating said vertical synchronizing pulses exceeds a threshold level.

3. The method of claim 1 wherein said step of generating a simulated version of equalizing pulses comprises separating said vertical blanking interval from the video signal; and generating a pulse whose width is substantially equal to the width of each equalizing pulse at the commencement of each equalizing and vertical synchronizing pulse included in the separated vertical blanking interval.

4. The method of claim 1 wherein said step of substituting comprises supplying the video signal to an output terminal; switching the signal supplied to the output terminal from the video signal to the simulated version of said equalizing pulses when said predetermined number of vertical synchronizing pulses is detected; and switching the signal supplied to said output terminal back to said video signal at a subsequent time during said vertical blanking interval.

5. A method of preparing a master video recording tape from which recorded video signals can be played back and used in a television receiver to reproduce a video picture but if said played back video signals are re-recorded on a copy tape, an accurate video picture will not be reproduced by playing back the video signals from said copy tape, the video signal including periodic vertical blanking intervals containing one set of equalizing pulses followed by a set of vertical synchronizing pulses followed by another set of equalizing pulses, said method comprising the steps of receiving said video signal; detecting the vertical blanking intervals of said received video signal; generating a first pulse of first duration after a first predetermined number of vertical synchronizing pulses in each vertical blanking interval has been received; generating a simulated version of said equalizing pulses; modifying said received video signal by substituting said simulated version of said equalizing pulses for that portion of said video signal which is received during the duration of said first pulse in at least some of said vertical blanking intervals; recording said modified video signal on the master tape; generating a second pulse of second duration after a second predetermined number of vertical synchronizing pulses in each detected vertical blanking interval has been received; generating a control pulse in response to and synchronized with each said second pulse; and recording said control pulses in a control track on the master tape.

6. The method of claim 5 wherein said step of generating a first pulse comprises integrating the equalizing and vertical synchronizing pulses included in said detected vertical blanking interval to produce a DC level; and generating said first pulse for as long as said DC level exceeds a first threshold.

7. The method of claim 6 wherein said step of generating a simulated version of equalizing pulses comprises generating a pulse of fixed width at the commencement of said equalizing and vertical synchronizing pulses included in said detected vertical blanking interval.

8. The method of claim 7 wherein said step of substituting comprises switching a recorder between said received video signal and said simulated version of said equalizing pulses in response to at least some of said first pulses.

9. The method of claim 8 wherein said step of generating a second pulse comprises generating said second pulse for as long as said DC level produced by integrating exceeds a second threshold greater than said first threshold.

10. The method of claim 9 wherein said step of generating a control pulse comprises dividing the frequency of said second pulses by two; and generating said control pulse during a predetermined portion of the frequency-divided second pulses.

11. Apparatus for processing a video signal, comprising: receiving means for receiving the video signal, said video signal including a vertical blanking interval during which a set of equalizing pulses followed by a set of vertical synchronizing pulses followed by another set of equalizing pulses are transmitted; generating means for generating simulated equalizing pulses having the same amplitude level and waveshape as said equalizing pulses included in said vertical blanking interval; substituting means for substituting said simulated equalizing pulses for at least some of said vertical synchronizing pulses and said other set of equalizing pulses in said received video signal; and output means to which said received video signal, including said substituted simulated equalizing pulses, are supplied.

12. The apparatus of claim 11 wherein said output means comprises a video signal recorder.

13. The apparatus of claim 12 wherein said video signal recorder is a video tape recorder of the type having a control transducer for recording a predetermined control track along video recording tape; detector means for detecting said vertical synchronizing pulses in said vertical blanking interval of said received video signal; and control pulse generating means responsive to said detected vertical synchronizing pulses for generating and supplying control pulses to said control transducer.

14. The apparatus of claim 13 wherein said detector means comprises integrating means coupled to receive said vertical blanking interval of said received video signal for integrating the equalizing and vertical synchronizing pulses included in said vertical blanking interval so as to produce an increasing DC level when said vertical synchronizing pulses are integrated; and pulse forming means for receiving said DC level to generate a pulse when said DC level exceeds a threshold level.

15. The apparatus of claim 11 wherein said output means comprises video signal transmission means.

16. The apparatus of claim 11 wherein said generating means comprises synchronizing signal separator means for separating said vertical blanking interval from said received video signal; and pulse generating means coupled to said synchronizing signal separator means for generating pulses whose amplitude and duration are substantially the same as said equalizing pulses, said generated pulses being generated in synchronism with said equalizing and vertical synchronizing pulses.

17. The apparatus of claim 16 wherein said pulse generating means comprises monostable multivibrator means responsive to a level transition in said equalizing and vertical synchronizing pulses.

18. The apparatus of claim 11 wherein said substituting means comprises switch means having one input coupled to receive said video signal, another input coupled to receive said simulated equalizing pulses, and an output for selectively supplying said video signal or said simulated equalizing pulses to said output means; and switch control means for determining which of said video signal and simulated equalizing pulses are supplied to said switch means output.

19. The apparatus of claim 18 wherein said control means comprises detector means for detecting said vertical synchronizing pulses in said vertical blanking interval of said received video signal to supply said switch means output with said simulated equalizing pulses.

20. The apparatus of claim 19 wherein said detector means comprises synchronizing signal separator means for separating said vertical blanking interval from said received video signal; integrating means coupled to said synchronizing signal separator means for integrating the equalizing and vertical synchronizing pulses included in said vertical blanking interval so as to produce an increasing DC level when said vertical synchronizing pulses are integrated followed by a decreasing DC level when said other equalizing pulses following said vertical synchronizing pulses are integrated; pulse forming means for receiving said DC level to generate a pulse when said DC level exceeds a threshold level; and means for supplying said generated pulse to said switch means, whereby said one input normally in connected to said output of said switch means and said other input is connected to said output in response to said generated pulse.

* * * * *